United States Patent
Gu et al.

(10) Patent No.: US 10,718,668 B2
(45) Date of Patent: Jul. 21, 2020

(54) MINIATURIZED FOURIER-TRANSFORM RAMAN SPECTROMETER SYSTEMS AND METHODS

(71) Applicants: Tian Gu, Fairfax, VA (US); Derek Matthew Kita, Cambridge, MA (US); Juejun Hu, Newton, MA (US)

(72) Inventors: Tian Gu, Fairfax, VA (US); Derek Matthew Kita, Cambridge, MA (US); Juejun Hu, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 2 days.

(21) Appl. No.: 16/058,927

(22) Filed: Aug. 8, 2018

(65) Prior Publication Data

US 2019/0049300 A1     Feb. 14, 2019

Related U.S. Application Data

(60) Provisional application No. 62/542,608, filed on Aug. 8, 2017.

(51) Int. Cl.
*G01J 3/44*      (2006.01)
*G01J 3/453*     (2006.01)
(Continued)

(52) U.S. Cl.
CPC ............... *G01J 3/44* (2013.01); *G01J 3/0218* (2013.01); *G01J 3/0259* (2013.01);
(Continued)

(58) Field of Classification Search
None
See application file for complete search history.

(56) References Cited

U.S. PATENT DOCUMENTS

D262,419 S     12/1981   Cramer
4,749,248 A     6/1988    Aberson, Jr. et al.
(Continued)

FOREIGN PATENT DOCUMENTS

WO    2012097982 A1    7/2012
WO    2013188520 A2   12/2013
WO    2014190331 A3    3/2015

OTHER PUBLICATIONS

Bogaerts et al., Silicon microring resonators. Laser & Photon. Rev. 2012, 6: 47-73. doi:10.1002/lpor.201100017.
(Continued)

*Primary Examiner* — Shawn Decenzo
(74) *Attorney, Agent, or Firm* — Smith Baluch LLP

(57) ABSTRACT

State-of-the-art portable Raman spectrometers use discrete free-space optical components that must be aligned well and that don't tolerate vibrations well. Conversely, the inventive spectrometers are made with monolithic photonic integration to fabricate some or all optical components on one or more planar substrates. Photonic integration enables dense integration of components, eliminates manual alignment and individual component assembly, and yields superior mechanical stability and resistance to shock or vibration. These features make inventive spectrometers especially suitable for use in high-performance portable or wearable sensors. They also yield significant performance advantages, including a large (e.g., 10,000-fold) increase in Raman scattering efficiency resulting from on-chip interaction of the tightly localized optical mode and the analyte and a large enhancement in spectral resolution and sensitivity resulting from the integration of an on-chip Fourier-transform spectrometer.

19 Claims, 6 Drawing Sheets

(51) Int. Cl.
*G01J 3/02* (2006.01)
*G01N 21/65* (2006.01)

(52) U.S. Cl.
CPC .............. *G01J 3/0272* (2013.01); *G01J 3/453* (2013.01); *G01J 3/4532* (2013.01); *G01N 21/65* (2013.01)

(56) References Cited

U.S. PATENT DOCUMENTS

| | | | |
|---|---|---|---|
| 4,969,742 A | 11/1990 | Falk et al. | |
| 5,044,715 A | 9/1991 | Kawachi et al. | |
| 5,546,181 A | 8/1996 | Kobayashi et al. | |
| 5,644,125 A | 7/1997 | Wobschall | |
| 5,751,415 A | 5/1998 | Smith et al. | |
| 5,814,565 A | 9/1998 | Reichert et al. | |
| 6,108,478 A | 8/2000 | Harpin et al. | |
| 6,205,279 B1 | 3/2001 | Kim et al. | |
| 6,370,422 B1 | 4/2002 | Richards-Kortum et al. | |
| 6,925,220 B2 | 8/2005 | Mukai | |
| 6,947,631 B2 | 9/2005 | Arai et al. | |
| 6,963,062 B2 | 11/2005 | Cyr et al. | |
| 6,975,781 B2 | 12/2005 | Takiguchi et al. | |
| 7,151,599 B2 * | 12/2006 | Islam | G01N 21/658 356/301 |
| 7,251,406 B2 | 7/2007 | Luo et al. | |
| 7,301,624 B2 | 11/2007 | Talley et al. | |
| 7,359,593 B2 | 4/2008 | Little | |
| 7,361,501 B2 | 4/2008 | Koo et al. | |
| 7,400,798 B2 | 7/2008 | De Almeida et al. | |
| 7,547,904 B2 * | 6/2009 | Schmidt | B01L 3/502715 250/573 |
| 7,636,157 B2 | 12/2009 | Wang et al. | |
| 7,864,321 B2 | 1/2011 | Caron et al. | |
| 8,098,379 B2 | 1/2012 | Okamoto | |
| 8,116,602 B2 | 2/2012 | Little et al. | |
| 8,121,450 B2 | 2/2012 | Webster et al. | |
| 8,297,128 B2 | 10/2012 | Delbos et al. | |
| D677,185 S | 3/2013 | Zhou et al. | |
| 8,406,580 B2 | 3/2013 | Takada et al. | |
| 8,545,759 B2 | 10/2013 | Niazi | |
| 8,615,324 B2 | 12/2013 | West | |
| 8,640,560 B2 | 2/2014 | Burke | |
| 8,718,981 B2 | 5/2014 | Bey et al. | |
| 8,809,765 B2 | 8/2014 | Weisshaar et al. | |
| 8,971,672 B2 | 3/2015 | Diemeer et al. | |
| D748,510 S | 2/2016 | Zhou et al. | |
| 9,529,158 B2 | 12/2016 | Sorger et al. | |
| 9,618,699 B2 | 4/2017 | Tummidi et al. | |
| 9,816,935 B2 | 11/2017 | Peumans et al. | |
| 10,006,809 B2 | 6/2018 | Hu et al. | |
| 10,054,546 B2 | 8/2018 | Stievater et al. | |
| 10,240,980 B2 | 3/2019 | Hu et al. | |
| 2002/0159684 A1 | 10/2002 | Sun et al. | |
| 2003/0048991 A1 | 3/2003 | Gonthier | |
| 2003/0156786 A1 | 8/2003 | Pan | |
| 2004/0001671 A1 | 1/2004 | Liu et al. | |
| 2004/0131310 A1 | 7/2004 | Walker | |
| 2004/0145741 A1 | 7/2004 | Cole et al. | |
| 2004/0150830 A1 * | 8/2004 | Chan | G01J 3/4535 356/479 |
| 2004/0151436 A1 * | 8/2004 | Chan | G01J 3/02 385/39 |
| 2005/0082480 A1 | 4/2005 | Wagner et al. | |
| 2005/0123244 A1 | 6/2005 | Block et al. | |
| 2005/0248758 A1 | 11/2005 | Carron et al. | |
| 2006/0159411 A1 | 7/2006 | Miller | |
| 2006/0166302 A1 | 7/2006 | Clarke et al. | |
| 2006/0170931 A1 | 8/2006 | Guo et al. | |
| 2006/0233504 A1 | 10/2006 | Hochberg et al. | |
| 2007/0013908 A1 | 1/2007 | Lee et al. | |
| 2007/0041729 A1 | 2/2007 | Heinz et al. | |
| 2007/0076208 A1 * | 4/2007 | Koo | G01J 3/44 356/451 |
| 2007/0077595 A1 * | 4/2007 | Koo | B82Y 30/00 435/7.1 |
| 2007/0237457 A1 | 10/2007 | Davis et al. | |
| 2008/0144001 A1 | 6/2008 | Heeg et al. | |
| 2009/0219525 A1 | 9/2009 | Marcus et al. | |
| 2010/0017159 A1 | 1/2010 | Burke | |
| 2010/0039644 A1 | 2/2010 | Choi et al. | |
| 2010/0130870 A1 | 5/2010 | Kopriva | |
| 2011/0116741 A1 | 5/2011 | Cevini et al. | |
| 2011/0125078 A1 | 5/2011 | Denison et al. | |
| 2011/0189050 A1 | 8/2011 | Schlereth et al. | |
| 2012/0105843 A1 | 5/2012 | Hirai et al. | |
| 2012/0215073 A1 | 8/2012 | Sherman et al. | |
| 2012/0242993 A1 | 9/2012 | Schick et al. | |
| 2013/0046357 A1 * | 2/2013 | Neev | A61N 5/022 607/45 |
| 2013/0071850 A1 | 3/2013 | Duer | |
| 2013/0259747 A1 | 10/2013 | Lee et al. | |
| 2013/0321816 A1 | 12/2013 | Dattner et al. | |
| 2013/0328866 A1 | 12/2013 | Woodgate et al. | |
| 2014/0092385 A1 * | 4/2014 | Nitkowski | G01J 3/18 356/326 |
| 2014/0098371 A1 | 4/2014 | Sabry et al. | |
| 2014/0375999 A1 | 12/2014 | Okamoto | |
| 2015/0010994 A1 | 1/2015 | Rao et al. | |
| 2015/0116721 A1 | 4/2015 | Kats et al. | |
| 2015/0146203 A1 | 5/2015 | Lai et al. | |
| 2016/0157706 A1 | 6/2016 | Pisanello et al. | |
| 2016/0258876 A1 | 9/2016 | Hosani et al. | |
| 2016/0305797 A1 | 10/2016 | Pietrasik et al. | |
| 2017/0108439 A1 | 4/2017 | Stievater et al. | |
| 2017/0227399 A1 * | 8/2017 | Hu | G01J 3/0218 |
| 2018/0011249 A1 | 1/2018 | Zhu et al. | |
| 2018/0106671 A1 * | 4/2018 | Claes | G01J 3/4531 |
| 2018/0140172 A1 | 5/2018 | Hu et al. | |
| 2018/0274981 A1 * | 9/2018 | Hu | G01J 3/0218 |
| 2019/0049300 A1 | 2/2019 | Gu et al. | |

OTHER PUBLICATIONS

Brouckaert et al., Planar Concave Grating Demultiplexer on a Nanophotonic Silicon-on-Insulator Platform, LEOS 2006—19th Annual Meeting of the IEEE Lasers and Electro-Optics Society, Montreal, Que., 2006, pp. 312-313. doi: 10.1109/LEOS.2006.279091.

Dhakal et al., Nanophotonic Waveguide Enhanced Raman Spectroscopy of Biological Submonolayers. ACS Photonics 2016, 3, 11, 2141-2149.

Hu et al., Angled multimode interferometer for bidirectional wavelength division (de)multiplexing. R Soc Open Sci. Oct. 21, 2015;2(10):150270. doi: 10.1098/rsos.150270. eCollection Oct. 2015.

Hung et al., Narrowband Reflection From Weakly Coupled Cladding-Modulated Bragg Gratings, in IEEE Journal of Selected Topics in Quantum Electronics, vol. 22, No. 6, pp. 218-224, Nov.-Dec. 2016, Art No. 4402507. doi: 10.1109/JSTQE.2015.2487878.

International Search Report and Written Opinion in PCT/US2018/045859 dated Nov. 2, 2018. 14 pages.

Kita et al., "On-Chip Infrared Spectroscopic Sensing: Redefining the Benefits of Scaling," in IEEE Journal of Selected Topics in Quantum Electronics, vol. 23, No. 2, pp. 340-349, Mar.-Apr. 2017, Art No. 5900110. doi: 10.1109/JSTQE.2016.2609142.

Martens et al., "Compact Silicon Nitride Arrayed Waveguide Gratings for Very Near-Infrared Wavelengths," in IEEE Photonics Technology Letters, vol. 27, No. 2, pp. 137-140, 15 Jan. 15, 2015. doi: 10.1109/LPT.2014.2363298.

Pathak et al., "Comparison of AWGs and Echelle Gratings for Wavelength Division Multiplexing on Silicon-on-Insulator," in IEEE Photonics Journal, vol. 6, No. 5, pp. 1-9, Oct. 2014, Art No. 4900109. doi: 10.1109/JPHOT.2014.2361658.

Stevens et al., Developing fibre optic Raman probes for applications in clinical spectroscopy. Chem Soc Rev. Apr. 7, 2016;45(7):1919-34. doi: 10.1039/c5cs00850f. Epub Mar. 9, 2016. Review. PubMed PMID: 26956027.

"Optical channel monitor based on planar lightwave circuit technology," Enablence, Ottawa, ON, Canada, Tech. Rep., (2010): 1-4.

(56) References Cited

OTHER PUBLICATIONS

Abaya, T. V. F. et al., "Characterization of a 3D optrode array for infrared neural stimulation," Biomedical Optics Express, 3(9): 2200-2219 (2012).
Aggarwal, "What's fueling the biotech engine—2010 to 2011." Nature biotechnology 29.12 (2011): 1083. 7 pages.
Akca et al., "Miniature spectrometer and beam splitter for an optical coherence tomography on a silicon chip," Optics Express, vol. 21, No. 14, (2013): 16648-16656.
Ako et al., "Electrically tuneable lateral leakage loss in liquid crystal clad shallow-etched silicon waveguides," Optics Express, vol. 23, No. 3, (2015): 2846-2856.
Babin et al., "Digital optical spectrometer-on-chip," Applied Physics Letters, vol. 95, No. 4, (2009): 1-4.
Bao et al., "A colloidal quantum dot spectrometer," Nature, vol. 523, (2015): 67-70.
Bauters et al., "Planar waveguides with less than 0.1 dB/m propagation loss fabricated with wafer bonding," Optics Express, vol. 19, No. 24, (2011): 24090-24101.
Birch et al., "An Updated Edlen Equation for the Refractive Index of Air," Metrologia, vol. 30, (1993): 155-162.
Birks et al. "The Photonic Lantern," Advances in Optics and Photonics, vol. 7, No. 2, (2015): 107-167.
Bock et al., "Subwavelength grating periodic structures in silicon-on-insulator: a new type of microphotonic waveguide." Optics express 18.19 (2010): 20251-20262.
Bogaerts et al., "Silicon-on-Insulator Spectral Filters Fabricated With CMOS Technology," IEEE Journal of Selected in Topics Quantum Electron, vol. 16, No. 1, (2010): 33-44.
Carmon et al., "Dynamical thermal behavior and thermal self-stability of microcavities," Optics Express, vol. 12, No. 20, (2004): 654-656.
Chao et al., "Compact Liquid Crystal Waveguide Based Fourier Transform Spectrometer for In-Situ and Remote Gas and Chemical Sensing," Proc. of SPIE, vol. 6977, (2008): 1-11.
Cheben et al. "A high-resolution silicon-on-insulator arrayed waveguide grating microspectrometer with sub-micrometer aperture waveguides," Optics Express, vol. 15, No. 5, (2007): 2299-2306.
Chen et al., "Heterogeneously Integrated Silicon Photonics for the Mid-Infrared and Spectroscoping Sensing," ACS Nano, vol. 8, No. 7, (2014): 6955-6961.
Civitci et al., "Planar Prism Spectrometer based on Adiabatically Connected Waveguiding Slabs," Optics Communications, vol. 365, (2016): 29-37.
Coarer et al., "Wavelength-scale stationary-wave integrated Fourier transform spectrometry," Nature Photonics, vol. 1, No. 8, (2007): 473-478.
Dalir, H. et al., "Spatial mode multiplexer/demultiplexer based on tapered hollow waveguide," IEICE Electronics Express, 8(9): 684-688 (2011).
DeCorby et al., "Chip-scale spectrometry based on tapered hollow Bragg waveguides," Optics Express, vol. 17, No. 19, (2009): 16632-16645.
Deutsch et al., "High-resolution miniature FTIR spectrometer enabled by a large linear travel MEMS pop-up mirror," Proc. of SPIE, vol. 7319, (2009): 1-8.
Dewan "Process Analytical Technologies for Pharmaceuticals: Global Markets," 2018. 263 pages.
Dewan, "Single Use Technology for Biopharmaceuticals: Global Markets," 2017. 163 pages.
Dhakal et al., "Nanophotonic waveguide enhanced Raman spectroscopy of biological submonolayers." ACS Photonics 3.11 (2016): 2141-2149.
Ding, Y. et al., "On-chip two-mode division multiplexing using tapered directional coupler-based mode multiplexer and demultiplexer," Optics Express, 21(8): 10376-10382 (2013).
Dong et al., "Nano-Silicon-Photonic Fourier Transform Infrared (FTIR) Spectrometer-on-aChip," Optical Society of America, vol. 1, (2015): 3-4.

Dorrer et al., "RF spectrum analysis of optical signals using nonlinear optics." Journal of lightwave technology 22.1 (2004): 266. 9 pages.
Du et al., "Low-loss photonic device in Ge—Sb—S chalcogenide glass," Optics Letters, vol. 41, No. 13, (2016): 3090-3093.
Dumais et al., "2x2 Multimode Interference Coupler with Low Loss Using 248 nm Photolithography," Optical Society of America, (2016): 19-21.
Evans et al., "TiO2 nanophotonic sensors for efficient integrated evanescent Raman spectroscopy." ACS Photonics 3.9 (2016): 1662-1669.
Fisher, "Going with the flow: continuous manufacturing," Pharmaceutical Technology, Jan. 22, 2012. 24 pages.
Florjanczyk et al., "Multiaperture planar waveguide spectrometer formed by arrayed Mach-Zehnder interferometers," Optics Express, vol. 15, No. 26, (2007): 18176-18189.
Food and Drug Administration, and Process Analytical Technology Initiative. "Guidance for Industry PAT-A Framework for Innovative Pharmaceutical development." Manufacturing and Quality Assurance (2004). 19 pages.
Gan et al., "A high-resolution spectrometer based on a compact planar two dimensional photonic crystal cavity array," Applied Physics Letters, vol. 100, No. 23, (2012): 1-4.
Gehm et al., "Static two-dimensional aperture coding for multimodal, multiplex spectroscopy," Applied Optics, vol. 45, No. 13, (2006): 2965-2974.
Guideline, ICH Harmonised Tripartite. "Pharmaceutical development." Q8. Current Step 4 (2009). 11 pages.
Harris et al., "Efficient, compact and low loss thermo-optic phase shifter in silicon," Optics Express, vol. 22, No. 9, (2014): 83-85.
Herres et al., "Understanding FT-IR Data Processing," Part 1: Data Acquistion and Fourier Transformation (1984): 352-356.
Herriott et al., "Folded Optical Delay Lines," Applied Optics, vol. 4, No. 8, (1965): 883-889.
Holmstrom et al., "Trace gas Raman spectroscopy using functionalized waveguides." Optica 3.8 (2016): 891-896.
Hu et al., "Cavity-Enhanced Infrared Absorption in Planar Chalcogenide Glass Microdisk Resonators: Experiment and Analysis," Journal of Lightwave Technology, vol. 27, No. 23 (2009): 5240-5245.
Hu, "Ultra-sensitive chemical vapor detection using microcavity photothermal spectroscopy," Optics Express, vol. 18, No. 21, (2010): 22174-22186.
International Search Report and Written Opinion dated Jun. 9, 2017 from International Application No. PCT/US17/17349, 30 pages.
International Search Report and Written Opinion dated Oct. 6, 2016 for International Application No. PCT/US16/43488, 17 pages.
Jiang et al., "Wavelength and bandwidth-tunable silicon comb filter based on Sagnac loop mirrors with Mach-Zehnder interferometer couplers," Optics Express, vol. 24, No. 3, (2016): 2183-2188.
Kita et al., "High-performance and scalable on-chip digital Fourier transform spectroscopy." Nature communications 9.1 (2018): 4405. 7 pages.
Klutz et al., "Developing the biofacility of the future based on continuous processing and single-use technology." Journal of biotechnology 213 (2015): 120-130.
Koonen, A. M. J. et al., "Silicon Photonic Integrated Mode Multiplexer and Demultiplexer," IEEE Photonics Technology Letters, 24(21): 1961-1964 (2012).
Kraft et al., "MEMS-based Compact FT-Spectrometers—A Platform for Spectroscopic Mid-Infrared Sensors," Sensors (2008): 1-4.
Kuczewski et al., "A single-use purification process for the production of a monoclonal antibody produced in a PER. C6 human cell line." Biotechnology journal 6.1 (2011): 56-65.
Kyotoku et al., "Sub-nm resolution cavity enhanced microspectrometer." Optics Express, vol. 18, No. 1, (2010): 102-107.
Lee et al., "In situ bioprocess monitoring of *Escherichia coli* bioreactions using Raman spectroscopy." Vibrational Spectroscopy 35.1-2 (2004): 131-137.
Lee et al., "Modernizing pharmaceutical manufacturing: from batch to continuous production." Journal of Pharmaceutical Innovation 10.3 (2015): 191-199.

(56) References Cited

OTHER PUBLICATIONS

Lee, "Modernizing the Way Drugs Are Made: A Transition to Continuous Manufacturing." Retrieved from FDA: https://www.fda.gov/Drugs/NewsEvents/ucm557448.htm (2017). 3 pages.
Lee, C.-K. et al., "Light field acquisition using wedge-shaped waveguide," 2013 IEEE International Conference on Consumer Electronics (ICCE), pp. 228-229.
Levine et al., "Efficient, flexible facilities for the 21st century." BioProcess Int 10.11 (2012): 20-30.
Lin et al., "Double resonance 1-D photonic crystal cavities for single-molecule mid-infrared photothermal spectroscopy: theory and design," Optics Letter, vol. 37, No. 8, (2012): 1304-1306.
Ma et al., "CMOS-Compatible Integrated Spectrometer Based on Echelle Diffraction Grating and MSM Photodetector Array." Photonics Journal, vol. 5, No. 2, (2013): 6600807-6600807.
Miller, "Perfect optics with imperfect components." Optica 2.8 (2015): 747-750.
Momeni et al., "Integrated photonic crystal spectrometers for sensing applications," Optics Communications, vol. 282, No. 15, (2009): 3168-3171.
Nedeljkovic et al., "Mid-Infrared Silicon-on-Insulator Fourier-Transform Spectrometer Chip," IEEE Photonics Technology Letters, vol. 28, No. 4, (2016): 528-531.
Nitkowski et al., "Cavity-enhanced on on-chip absorption spectroscopy using microring resonators," Optics Express, vol. 16, No. 16, (2008): 11930-11936.
Nitkowski et al., "On-chip spectrophotometry for bioanalysis using microring resonators," Biomedical Optics Express, vol. 2, No. 2, (2011): 271-277.
Overton, "How spectrometers have shrunk and grown since 2010," Laser Focus World, vol. 52, No. 2, (2016): 35-41.
Petit et al., "Compositional dependence of the nonlinear refractive index of new germanium-based chalcogenide glasses," Journal of Solid State Chemistry, vol. 182, No. 10, (2009): 2756-2761.
Pisanello, F. et al., "Multipoint-Emitting Optical Fibers for Spatially Addressable In Vivo Optogenetics," Neuron, 82 (6): 1245-1254 (2014).
Redding et al., "All-fiber spectrometer based on speckle pattern reconstruction," Optics Express, vol. 21, No. 5, (2013): 6584-6600.
Redding et al., "Compact spectrometer based on a disordered photonic chip," Nature Photonics, vol. 7, No. 9, (2013): 746-751.
Redding et al., "Using a multimode fiber as a high-resolution, low-loss spectrometer," Optics Letters, vol. 37, No. 16, (2012): 3384-3386.
Reyes et al., "A novel method of creating a surface micromachined 3D optical assembly for MEMS-based miniaturized FTIR spectrometers," Proc. of SPIE, vol. 6888, (2008): 1-8.
Robinson et al., "First-principle derivation of gain in high-index-contrast waveguides," Optics Express, vol. 16, No. 21, (2008): 16659-16669.
Roelkens et al., "Silicon-based heterogeneous photonic integrated circuits for the mid-infrared," Optical Materials Express, vol. 3, No. 9, (2013): 1523-1536.
Schuler et al., "MEMS-based microspectrometer technologies for NIR and MIR wavelengths," Journal of Physics D: Applied Physics, vol. 42, No. 13, (2009): 1-13.
Sellar et al., "Comparison of relative signal-to-noise ratios of different classes of imaging spectrometer," Applied Optics, vol. 44, No. 9, (2005): 1614-1624.
Sharpe et al., "Gas-phase databases for quantitative infrared spectroscopy," Applied Spectroscopy, vol. 58, No. 12, (2004): 1452-1461.
Shiryaev et al., "Preparation of optical fibers based on Ge—Sb—S glass system," Optical Materials, vol. 32, No. 2, (2009): 362-367.
Singh et al., "Raman spectroscopy of complex defined media: biopharmaceutical applications." Journal of Raman Spectroscopy 46.6 (2015): 545-550.
Singh et al., "Mid-infrared materials and devices on a Si platform for optical sensing," Sciencce and Technology of Advanced Materials, vol. 15, No. 1, (2014): 1-15.
Smith et al., "Sensing nitrous oxide with QCL-coupled siliconon-sapphire ring resonators," Optics Express, vol. 23, No. 5, (2015): 5491-5499.
Soole et al., "Monolithic InP/InGaAsP/InP grating spectrometer for the 1.48-1.56µm wavelength range," Applied Physics Letters, vol. 58, No. 18, (1991): 1949-1951.
Stark, E. et al., "Diode probes for spatiotemporal optical control of multiple neurons in freely moving animals," J Neurophysiol, 108(1): 349-363 (2012).
Subramanian et al., "Silicon and silicon nitride photonic circuits for spectroscopic sensing on-a-chip." Photonics Research 3.5 (2015): B47-B59.
Subramanian et al., "Silicon and silicon nitride photonic circuits for spectroscopic sensing on-a-chip," Photon. Res., vol. 3, No. 5, (2015): 47-59.
Szymanski, Raman spectroscopy: theory and practice. Springer Science & Business Media, 2012.
Tamazin et al., "Ultra-broadband Compact Adiabatic Coupler in Silicon-on-Insulator for Joint Operation in the C-and O-Bands." CLEO: Science and Innovations. Optical Society of America, 2018. 2 pages.
Travis, A. et al., "Collimated light from a waveguide for a display backlight," Optics Express, 17(22): 19714-19719 (2009).
Travis, A. R. L. et al., "Wedge Optics in Flat Panel Displays," Proceedings of the IEEE, 101(1): 45-60 (2013).
Wan et al., "High-resolution optical spectroscopy using multimode interference in a compact tapered fibre," Nature Communications, vol. 6, (2015): 1-6.
Wang et al., "Polarization-Independent Mode-Evolution-Based Coupler for the Silicon-on-Insulator Platform." IEEE Photonics Journal 10.3 (2018): 1-10.
Wen et al., "All-optical switching of a single resonance in silicon ring resonators," Optics Letters, vol. 36, No. 8, (2011): 1413-1415.
Wilkes et al., "60 dB high-extinction auto-configured Mach-Zehnder interferometer." Optics letters 41.22 (2016): 5318-5321.
Wilkings, "Disposable bioreactor sensors play catch-up." Bioprocess Int, Westborough 56 (2011). 4 pages.
Xia et al., "High resolution on-chip spectroscopy based onminiaturized microdonut resonators," Optics Express, vol. 19, No. 13, (2011): 12356-12364.
Xu et al., "High speed silicon Mach-Zehnder modulator based on interleaved PN junctions," Optical Express, vol. 20, No. 14, (2012): 15093-15099.
Xu et al., "Multimodalmultiplex spectroscopy using photonic crystals," Optical Express, vol. 11, No. 18, (2003): 2126-2133.
Yu, "Continuous manufacturing has a strong impact on drug quality." FDA Voice 12, Apr. 13, 2016. 5 pages.
Zhang et al., "A compact and low loss Y-junction for submicron silicon waveguide," Optical Express, vol. 21, No. 1, (2013): 1310-1316.
Saar et al., "Coherent Raman scanning fiber endoscopy," Optics Letters, vol. 36, No. 13, dated Jul. 1, 2011, 3 pages.
International Preliminary Report on Patentability for International Application No. PCT/US15/062509, dated Jun. 8, 2017, 9 pages.
International Search Report and Written Opinion in International Patent Application No. PCT/US2019/039689 dated Oct. 31, 2019, 17 pages.
International Search Report and Written Opinion issued by the International Searching Authority for International Application No. PCT/US15/062509, dated Feb. 1, 2017, 10 pages.

\* cited by examiner

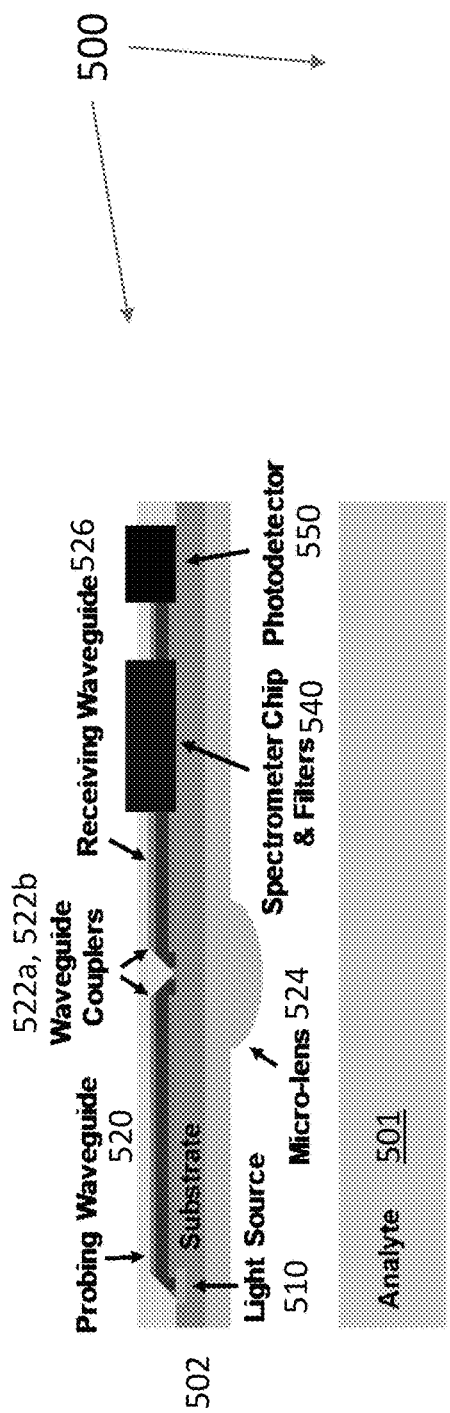
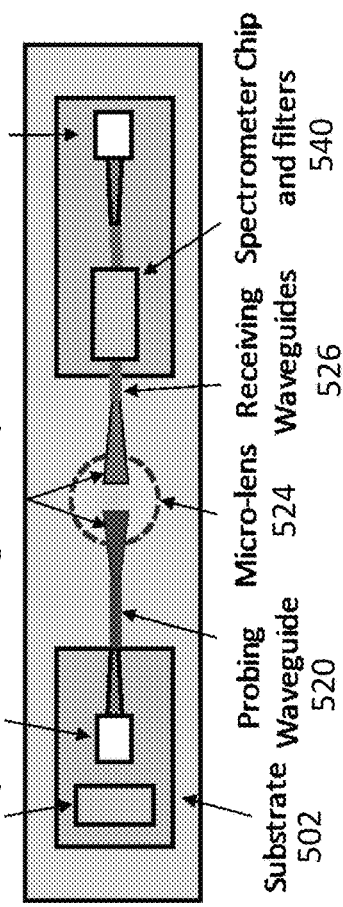
FIG. 5A
FIG. 5B

MINIATURIZED FOURIER-TRANSFORM RAMAN SPECTROMETER SYSTEMS AND METHODS

CROSS-REFERENCE TO RELATED APPLICATION(S)

This application claims the priority benefit, under 35 U.S.C. § 119(e), of U.S. Application No. 62/542,608, filed Aug. 8, 2018, and entitled "Miniaturized Fourier-Transform Raman Spectrometer System," which is incorporated herein by reference in its entirety.

BACKGROUND

A Raman spectrometer or Raman spectrophotometer is a device that optically probes the vibrational, rotational, and low-frequency modes of a solid, liquid, or gaseous chemical or material. It can accurately quantify the chemical structure of an unknown substance. A Raman spectrometer typically operates by first illuminating a sample with a single frequency laser in the visible or near-infrared wavelength region. A fraction of the light that scatters from the sample is converted to a higher optical frequency (anti-Stokes shifted), and another fraction is converted to a lower optical frequency (Stokes shifted). The new frequencies of this Stokes and anti-Stokes shifted light (also referred to as Raman-shifted light) correspond to the intrinsic energy levels of the substance being sensed, and they can be used to uniquely identify the chemical or material, as shown in FIG. 1.

Conventional Raman spectrometer systems usually include several distinct sub-systems: (1) a single-frequency excitation source, such as a laser; (2) an optical probe or region where the light interacts with the analyte or unknown chemical of interest; (3) a dichroic mirror or optical filter that blocks the light from the excitation source, letting only the Stokes or anti-Stokes scattered light pass; and (4) a spectrum analyzer or spectrometer that measures the intensity of the Raman shifted light as a function of frequency or wavelength.

The spectrum analyzer typically includes a dispersive element, such as a grating or prism, that disperses the Raman scattered light for detection by a detector array. The measured Raman spectrum typically contains several peaks, the frequency and intensity of which serve as a unique 'optical fingerprint' of the chemical being identified. By comparing this spectrum to a database of known Raman spectra, the composition of single chemicals or mixtures of chemicals in the gas, liquid, or solid phase can be determined with high precision.

In biomedical sensing, Raman spectroscopy is also a promising approach for non-invasively detecting critical physiological and biochemical parameters, such as blood glucose, lactate, blood oxygen saturation levels, etc., owing to its superior chemical selectivity and availability of near-infrared light sources with sufficient penetration depth into biological tissues. Wearable non-invasive blood glucose monitoring promises great relief to diabetes patients for glucose control but remains an outstanding challenge despite the development of commercial glucose meters in the past few decades.

Conventional Raman spectroscopy systems are usually benchtop laboratory equipment with large size and high cost. Portable Raman spectrometers have slowly begun to enter the market in the last five years, though their size reduction has relied primarily upon direct miniaturization of discretely-assembled free-space optical components that need to be manually aligned, such as mirrors, beam-splitters, free-space lenses, and free-space grating spectrometers. These discrete optical components typically do not withstand physical shock or vibrations without requiring realignment or recalibration. In addition, these grating spectrometers suffer from poor sensitivity (which is related to the signal-to-noise ratio), have limited spectral resolution (typically to no more than 1024 channels), and are relatively large and heavy.

SUMMARY

Embodiments of the present technology generally relate to Fourier transform Raman spectrometers. In one example, a Fourier transform Raman spectrometer system includes a light source to emit a probe beam and a probe waveguide, in optical communication with the light source, to receive the probe beam and cause at least a portion of the probe beam to interact with a sample. The interaction between the probe beam and the sample generates a Raman signal. The system also includes a filter in optical communication with the probe waveguide and configured to transmit the Raman signal and block the probe beam and a Fourier transform spectrometer in optical communication with the filter. The Fourier transform spectrometer includes a beam splitter to split the probe beam into a first portion and a second portion, a first interference arm in optical communication with the beam splitter, to receive the first portion of the probe beam, and a second interference arm in optical communication with the beam splitter to receive the second portion of the probe beam. The first interference arm includes a first optical switch switchable between a first state and a second state, a first reference waveguide having a first optical path length $L_1$ to receive the first portion of the probe beam when the first optical switch is in the first state, and a first variable waveguide having a second optical path length $L_2$, different than the first optical path length $L_1$, to receive the first portion of the probe beam when the first optical switch is in the second state. The system also includes a detector, in optical communication with the first interference arm and the second interference arm, to detect interference of the first portion of the incident light from the first interference arm and the second portion of the incident light from the second interference arm.

Another embodiment is a Raman spectroscopy system that includes a laser, a first waveguide in optical communication with the laser, a lens in optical communication with the first waveguide, at least one second waveguide in optical communication with the lens, to guide the Raman signal, a spectrometer in optical communication with the at least one second waveguide, and at least one photodetector in optical communication with the spectrometer. These components are on or in a substrate. In operation, the laser emits a probe beam, which the first waveguide guides to the lens. The lens directs the probe beam to a sample and collects a Raman signal that is scattered and/or reflected from the sample in response to the probe beam. The second waveguide guides the Raman signal to the spectrometer, which separates the Raman signal into spectral bins. And the photodetector detects an output of the spectrometer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5A shows a side view of a 3D waveguide-coupled probing/detecting approach where probe beam are coupled out of and into waveguides via a pair of reflective facets and a micro-lens integrated on the waveguide substrate to form a prescribed illumination pattern on the analyte.

FIG. 5B shows a top view of a 3D waveguide-coupled FTIR Raman spectrometer of FIG. 5A.

DETAILED DESCRIPTION

Figure 1:
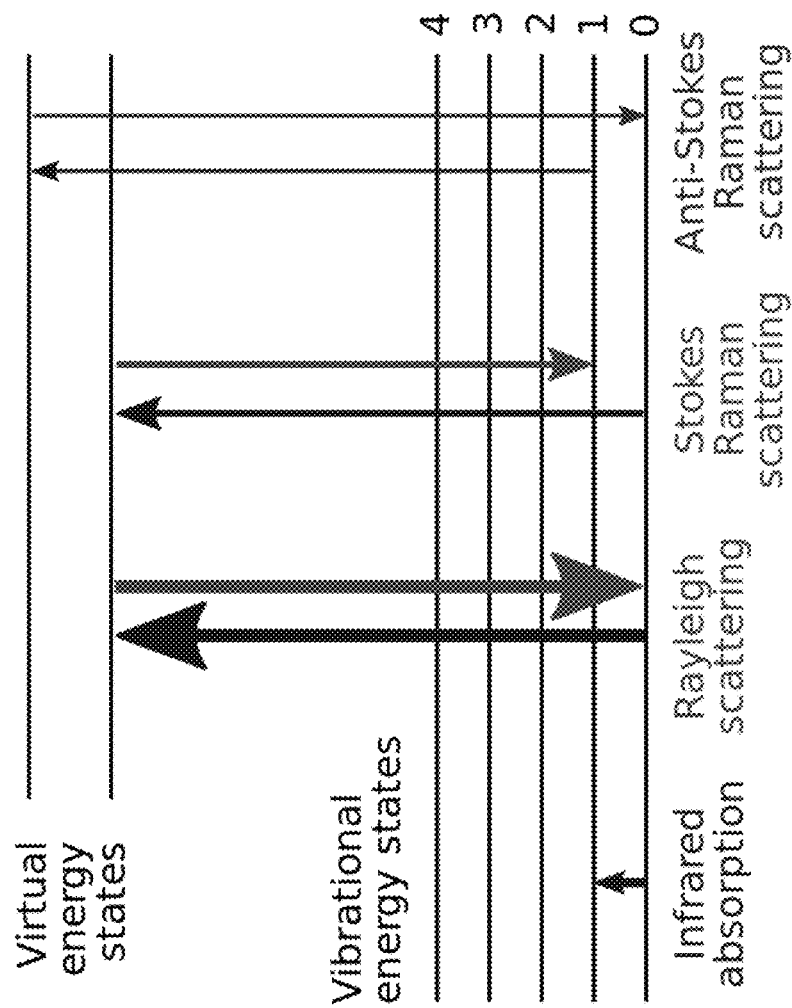
FIG. 1 shows an energy diagram illustrating changes in frequency of Raman scattered light that corresponds to the molecular energy levels.

One method of enhancing the low signal typically generated by Raman scattering is by using a Fourier-transform spectrometer. A Fourier-transform spectrometer is an interferometer that measures an optical spectrum with a signal-to-noise ratio (SNR) that is $\sqrt{N}/2$ times higher than that of a dispersive grating spectrometer (for a given sampling bandwidth), where N is the number of wavelengths to be measured. Current Fourier-transform Raman (FT-Raman) spectrometers are large, bulky, benchtop instruments since Fourier-Transform spectrometers typically include interferometer arms that move back and forth.

Up to now, no complete Raman spectrometer system or Fourier-transform Raman spectrometer system has integrated on-chip photonic sensing elements, filters, and/or spectrometers. Monolithic integration of optical components, as described below, results in devices with vastly smaller form-factors, superior robustness (no moving parts), high spectral resolution, and enhanced sensitivity to chemical species.

Unlike state-of-the-art portable Raman spectrometers with discrete free-space optical components, the spectrometers disclosed herein exploit monolithic photonic integration with all or most optical components integrated on one or more planar substrates. Photonic integration enables dense integration of components without the need for manual alignment or individual component assembly. Photonic integration also produces superior mechanical stability and resistance to shock or vibration, which is beneficial to high-performance portable and wearable sensors. Significant performance advantages of photonic integration include (1) a large (e.g., factor of $\sim 10^4$) improvement in Raman scattering efficiency resulting from on-chip interaction of the tightly localized optical mode and the gas, liquid, or solid analyte, and (2) a large enhancement in spectral resolution and sensitivity resulting from the integration of an on-chip FT-spectrometer. Robust wearable bio-photonic sensors for continuous and non-invasive monitoring of physiological and biomedical parameters are also disclosed.

A miniaturized FT-Raman spectrometer can include the following components: (1) a single-frequency light source; (2) a probe that allows single-frequency light (a probe beam) from the single-frequency light source to interact with a target sample of interest; (3) one or more optical filters to allow a certain band of light to pass (e.g., a filter that removes the single-frequency light while passing the Raman-shifted light); (4) a miniaturized spectrometer that separates received light in different spectral bins (e.g., power of light at each Raman-shifted frequency); and (5) one or more detectors that measure the output optical powers in the spectral bins.

The light source may be a laser that emits light in the visible or infrared band. The above-mentioned components may be integrated on a single substrate or multiple substrates. In addition to the above-mentioned components, the device can further include analog and digital electronics to power the laser, control the on-chip optical circuit, and measure the signal(s) emitted by the photodetector(s) in response to incident light. The entire unit can be packaged in a portable form that can be held by hand or carried in one's pocket; worn in a wearable form that can be applied on fingers, wrist, forehead, etc.; or packaged as a ring, a wristband, or an adhesive patch.

The FT-Raman spectrometer system combines a number of on-chip and fiber-/waveguide-connected optical components as described below. First, each component of the on-chip FT-Raman system is described in depth. Lastly, several unique, exemplary embodiments are disclosed.

The laser source that generates the excitation light can be any wavelength in the visible or near-infrared, including, but not limited to, 457 nm, 473 nm, 488 nm, 514 nm, 532 nm, 633 nm, 660 nm, 785 nm, 830 nm, 980 nm, or 1064 nm. Since the Raman scattering intensity is usually proportional to $1/\lambda^4$, with $\lambda$ being the wavelength of the excitation light, lower wavelengths are typically preferred. However, using a longer-wavelength laser source, such as a 1064 nm near-infrared Nd:YAG laser, can suppress fluorescence, thereby decreasing background noise and enhancing the sensitivity.

Integration of the laser source can be accomplished in at least three ways. The first is directly bonding a waveguide-integrated III/V laser onto the separate FT-Raman chip with the rest of the optical components to deliver light directly to an on-chip probe. The second involves connecting a separate fiber-coupled laser module to the on-chip probe via tapered edge-coupling or end-fire coupling, or directly connecting the fiber-coupled laser module to a lensed fiber probe. Additionally, depending on the amount of reflection from subsequent optical components, a fiber-integrated optical isolator may be used between the laser and the spectrometer chip to prevent light from reflecting back into the laser. The third involves direct fabrication of the entire FT-Raman spectrometer, including the laser (such as a DFB laser), on a III/V material substrate, such as Indium Phosphide (InP).

The optical probe of the miniaturized FT-Raman spectrometer can be configured at least in the following ways: (1) a lensed-tip, flat-face, beveled-tip, or ball-lens-tip fiber; (2) an exposed on-chip single-mode waveguide; or (3) an on-chip waveguide including out-of-plane coupling structures. For the fiber probe, the laser light is first coupled to a fiber that passes through an optical circulator or a 1×2 beam combiner and then to the fiber tip. This fiber can then focus the light at the tip, resulting in high optical energy densities that produce Raman scattering efficiencies comparable to confocal Raman microscopy. In addition, the use of fiber probes allows Raman sensing to occur in confined spaces, making this device useful for medical and surgical diagnostics.

Figure 3:
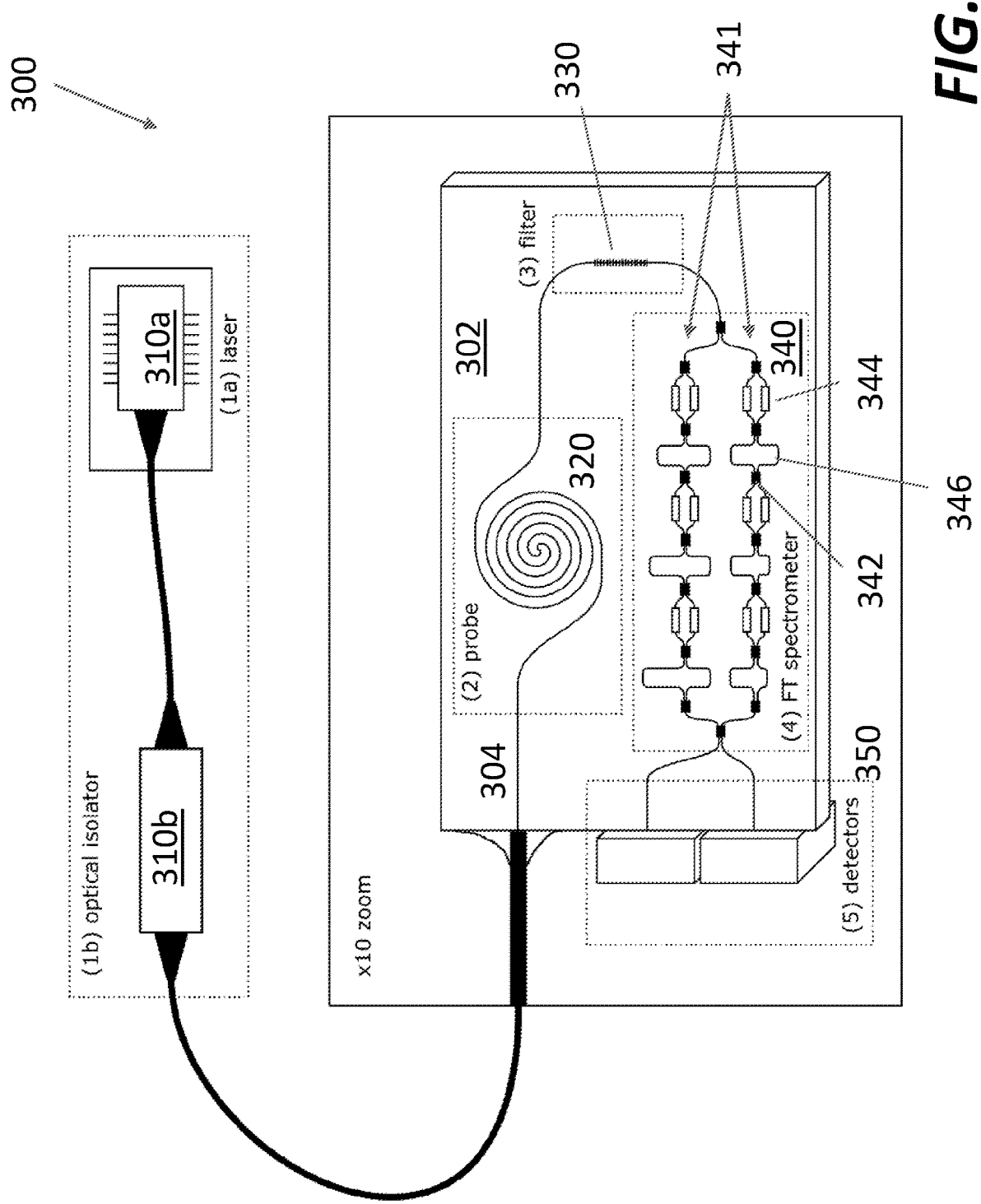
FIG. 3 shows a schematic of a miniaturized on-chip FT-Raman spectrometer with four optical components integrated on a single chip. The dotted lines denote (1a, b) a single-mode, fiber-coupled laser source and optical isolator edge-coupled to an on-chip waveguide that connects to (2) a spiral-shaped optical probe region, (3) waveguide-integrated Bragg reflector (filter), and (4) FT-spectrometer. The waveguide terminates at the side of the chip and the light is collected by one or two (5) large-area, single-element photodetectors epoxy-bonded to the edge of the chip.

In the second probe configuration, light from the excitation source is directly coupled to an on-chip single-mode waveguide. This waveguide continues to a region where the top-cladding is exposed or where the waveguide mode profile experiences a change, e.g., due to a change of refractive index contrast between the waveguide core and cladding regions or change of waveguide geometries. In this region, light in the evanescent tail of the waveguide mode interacts with nearby gases, liquids, or solids. The Raman signal from this type of probe configuration is typically enhanced by four orders of magnitude due to the dense confinement of light in the single-mode waveguide, the large collection efficiencies, and the ability to arbitrarily increase the interaction length by increasing the length of the waveguide. An on-chip waveguide probe can be configured as a straight waveguide, a paperclip structure, or a spiral waveguide, which exhibits a long optical path length per area with few if any sharp waveguide bends, as shown in FIG. 3 (described below).

In the third probe configuration, laser light originally propagating in a probing waveguide is coupled out-of-plane and received by a receiving waveguide after interacting with the analyte, which allows 3D waveguide-coupled sensing of a substance via a planar structure. Such an optical sensing structure includes a substrate, a light source and light source coupler, a probing waveguide, a probing waveguide coupler, a receiving waveguide coupler, a receiving waveguide, a spectrometer chip, and one or more photodetectors.

Basic operation is as follows: light emitted from a laser is first coupled into the probing waveguide by the light source coupler via either the edge or surface and then propagates inside the waveguide. The probing waveguide coupler subsequently redirects the light out of the waveguide towards the region of interests for sensing. After interacting with the analyte, scattered or reflected light is collected by the receiving waveguide coupler and coupled into the receiving waveguide in which it propagates to the subsequent elements (e.g., filters, spectrometer chip, photodetectors, etc.). Exemplary probing and receiving waveguide couplers include reflective facets, curved facet couplers, microlenses, gratings, holography, etc., or combinations of such elements.

The third system includes an on-chip waveguide integrated filter. The on-chip waveguides and filter can be made on a variety of material platforms, such as silicon nitride strip waveguide cores surrounded by silicon dioxide cladding, a silicon strip waveguide core surrounded by silicon dioxide cladding, a germanium strip waveguide core surrounded silicon, or any III-V semiconductor material forming the strip waveguide core and cladding including, but not limited to InP, InAsP, InGaAsP, etc. This filter reflects light at the laser excitation wavelength, while allowing up to 100% of the Raman scattered light to pass. In addition to filtering laser light out of the spectrum, the filter may reflect the laser light back to the probe, where it may scatter additional Raman light.

This filter can be realized by several means, such as a periodic Bragg reflector. A Bragg reflector includes a waveguide with a width or cladding that is modulated with a period such that light at the excitation wavelength is reflected with high efficiency. Additional means include, but are not limited to, planar concave gratings, arrayed-waveguide gratings, echelle gratings, angled multi-mode interferometers, ring cavity filters, Mach-Zehnder interferometer filters, and Vernier effect filters.

Another method of filtering out the light at the excitation wavelength is by narrowing the waveguide width such that the mode's cutoff frequency lies below the frequency of the excitation source. The wavelength of the excitation is usually shorter than the wavelength of the Stokes line. This technique works for Raman spectroscopy measuring anti-Stokes shifted light. Such waveguide-integrated filters are lithographically fabricated in parallel with the other on-chip optical components.

Figure 4:
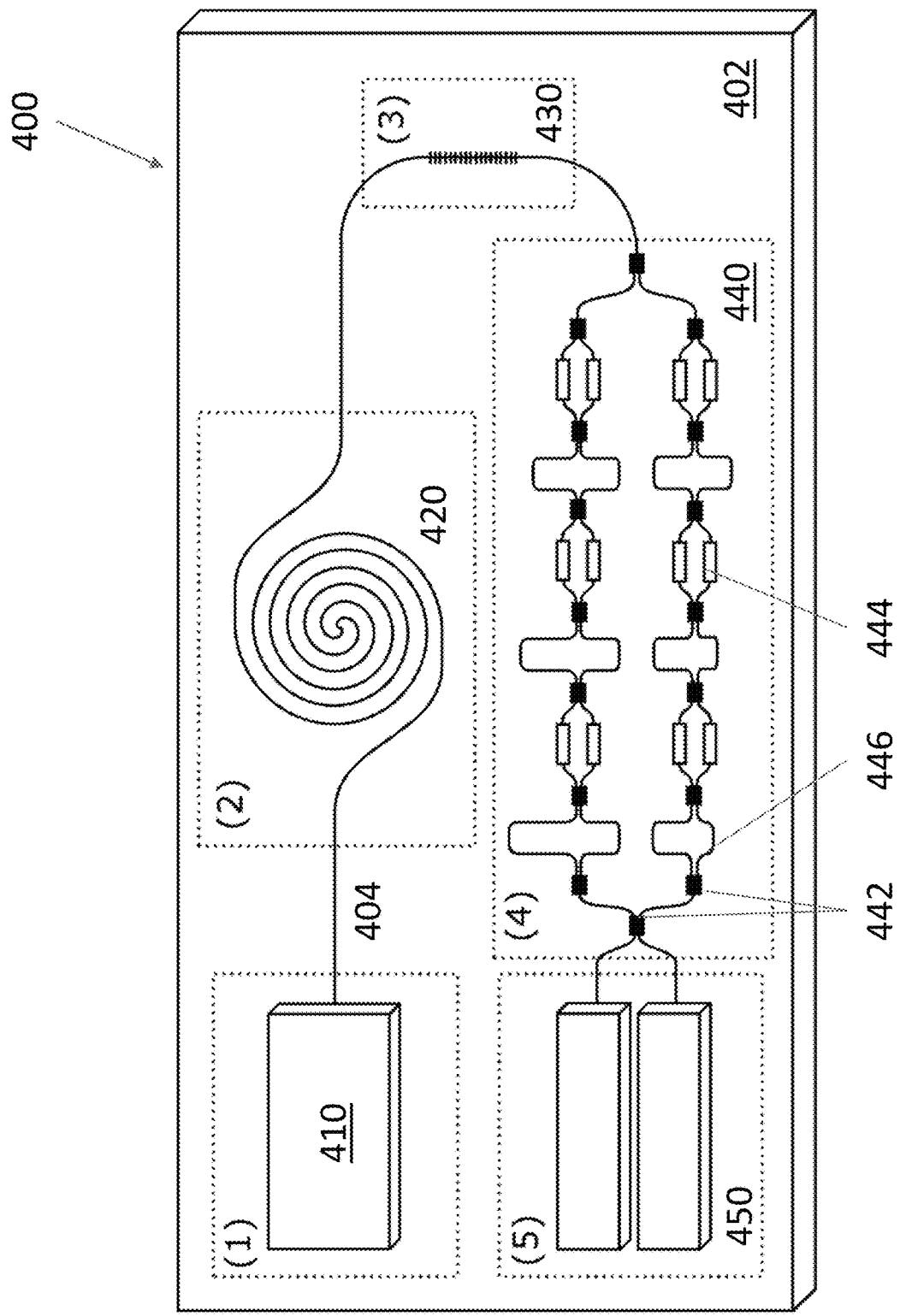
FIG. 4 shows a schematic of a miniaturized on-chip FT-Raman spectrometer with five distinct optical components completely integrated on a single chip.

The Raman scattered light then travels via the optical waveguide to an on-chip FT-spectrometer utilizing the same material platform as described before. The FT-spectrometer can be monolithically defined on a planar substrate or chip, with no moving parts. The schematic is shown in FIGS. 3 and 4, described below. The waveguide after the filter is split into two interferometer arms by an on-chip beam-splitter or 1×2 multi-mode interferometer (MMI). Each interferometer arm has a discrete number of repeated units that each includes an optical switch that guides light into one of two waveguides with different path lengths.

Each optical switch can take the form of a Mach-Zehnder interferometer with phase modulators that cause the light to transmit through only one of the two beam-combiner, or 2×2 MMI, outputs. The last component of the interferometer is a 2×2 MIMI that combines the light from both arms of the interferometer. Each output of the 2×2 MMI provides information about the magnitude and phase of the interferogram. Each optical switch in the FT-spectrometer has two states, guiding light to the 'top' or the 'bottom' path. Thus, for a FT-spectrometer as shown in FIGS. 3 and 4 with six optical switches, there are $2^6=64$ unique interferometer optical path length differences, corresponding to 64 measurable spectral data points. This type of scaling means that a 40% increase in chip-size (going from six switches to ten switches) results in a spectral resolution of $2^{10}=1024$ data points.

More information about the Fourier transform spectrometer can be found in U.S. patent application Ser. No. 15/429, 321, entitled "APPARATUS, SYSTEMS, AND METHODS FOR ON-CHIP SPECTROSCOPY USING OPTICAL SWITCHES," which is hereby incorporated herein by reference in its entirety.

Traditional linear detector arrays also have electrical wiring and control of all 1024+ photodetectors. Conversely, integration of this particular type of FT-spectrometer means the same resolution can be accomplished for a small fraction of the chip-space and electrical routing of twenty 2-terminal phase modulators (2 phase modulators optical switch) and one 2-terminal photodetector, rather than electrical routing of 1024 2-terminal photodetectors.

The output of the on-chip FT-spectrometer is routed to one or two single-element photodetectors. These may be on-chip waveguide integrated detectors, such as germanium on silicon photodetectors, or off-chip single element detectors. These may include silicon, indium gallium arsenide (InGaAs), or germanium detectors, or any other detector capable of detecting light in this band. Light from the waveguide can be coupled to a fiber or waveguide that is then connected to the photodetector. A second possible embodiment includes on-chip detectors that are hybrid bonded or flip-chip bonded to the surface of the chip with the FT-spectrometer. A third embodiment of this component is direct epoxy-bonding of a large, single element detector to the edge of the spectrometer chip. This last embodiment is low-cost, easy to scale for manufacturing (precise optical alignment is not necessary), and more robust than fiber-coupling.

FIGS. 2A and 2B show a thin, pen-sized spectrometer 200 that can be easily carried by hand or in a person's pocket. Pointing the device 200 at a substance of unknown chemical composition and pressing a button 217 on the side begins the process of acquiring a Raman spectrum. The spectral information is then sent to a nearby cell-phone, computer, or server for spectral analysis. The spectrum is cross-referenced against a known database of Raman spectra, and information about the type of chemical, the concentration, and the match quality (such as hit-quality index, or HQI) is presented to the user on the FT-Raman spectrometer or on the user's cell-phone screen. The excitation light delivery can also be done via lenses. One advantage of using a lens is that the system may be free of circulators.

FIG. 2A shows a cross section of the pen-sized spectrometer 200. It includes a single-frequency laser 213 that is connected to a 2×1 beam combiner 208 via a first single-mode fiber connector 214. The other ports of the 2×1 beam combiner 208 are coupled to a lensed or tapered fiber tip 210 via a second single-mode fiber connector 209 and to an edge-, butt-, or grating coupler 206 via a third single-mode fiber connector 207. The coupler 206 is coupled to an on-chip band-pass or low-pass filer 205, which in turn is coupled to an on-chip Fourier-transform infrared (FTIR) spectrometer 204. The output of the FTIR spectrometer 204 is coupled a broadband photodiode or photodetector 201 via another coupler 203 and a fourth single-mode fiber coupler 202. The device 200 may also include an electronic printed circuit board 211 with electronic for controlling the laser 213 and FTIR spectrometer 204 for reading signals from the photodetector 201 and an antenna for communicating with a cell phone or other wireless device. These components may be included in a housing 216, along with a power supply 215, that includes openings for a button 217 that actuates the spectrometer 200 and a screen 218 for displaying the analysis results.

Figure 2:
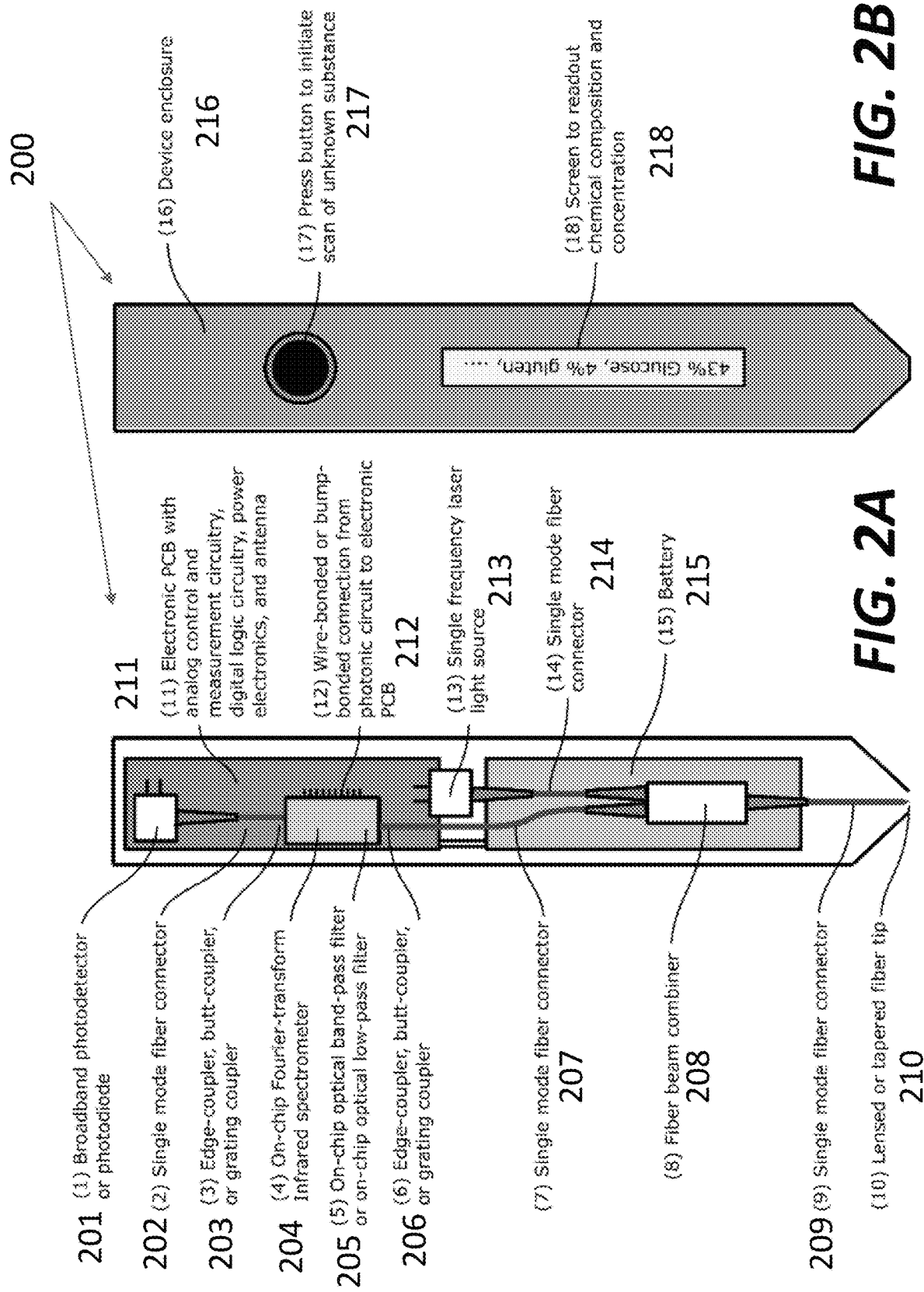
FIG. 2A shows a longitudinal cross section of a miniaturized Fourier-transform Raman spectrometer and chemical analyzer.
FIG. 2B shows a profile view of the miniaturized Fourier-transform Raman spectrometer and chemical analyzer of FIG. 2A.

From FIG. 2, the detailed operation of the device is as follows: first, the user brings the tip of the lensed or tapered fiber 210 within close proximity to the substance to be analyzed, and then presses an external button 217 to begin the scan and identify the types of chemicals present. Pressing the button turns on the single frequency laser source in the visible or near-infrared wavelength range 213, which sends light (a probe beam) down the first single-mode fiber 214 and through the fiber beam combiner or optical circulator 208 and to a second single-mode fiber 209. The light exits the fiber 209 through the lensed or tapered fiber tip 210 and interacts with the substance to be identified (not shown). The lensed or tapered fiber tip 210 collects the scattered Raman light, which travels back down the single-mode fiber connector 209 to the fiber beam combiner or optical circulator 208, which couples it into another single-mode fiber connector 207.

Here, the light enters an on-chip waveguide (not shown) through either an edge-coupler, butt-coupler, or grating coupler 206. On the optical chip, the light passes through the waveguide integrated band-pass filter or an on-chip low-pass filter 205, which can take the form of a Bragg grating, ring resonator, selectively absorbing element, or narrow waveguide with specific cutoff frequency. After this, the light travels to the on-chip FTIR spectrometer 204. After light passes through the interferometer, it exits in either one or two separate waveguides (not shown). The light in these one or two waveguides exit the photonic chip through another edge coupler, butt-coupler, grating coupler, or free-space lens 203 (or other free space coupling mechanisms). This light then passes through one or two single mode fibers 202 and is measured by one or two broadband photodetectors 201.

This procedure is performed several different times, for different configurations of the on-chip FTIR. Digital and analog electronics 211 measure the signal from the photodetector 201, power the excitation laser 213, and control the optical switches in the on-chip FTIR spectrometer 204. In addition, the electronics 211 digitally calculate the spectrum of the Raman shifted light and send the data to a separate device (e.g., a cell-phone, computer, or server) that compares this spectrum to a spectral database. Once the chemical compositions have been determined, they are sent back to the pen-shaped FT-Raman spectrometer 200 and the result is either displayed on a front-panel display 218. Alternatively, the other device (e.g., the cell phone) may display the results directly instead of or in addition to sharing them with the spectrometer 200.

FIG. 3 shows an example integrated on-chip FT-Raman spectrometer system 300 with many components integrated on-chip. In this system, a single-mode fiber-coupled source laser 310a is coupled to an optical isolator 310b (to prevent reflections at the chip facet from damaging the laser diode). An output fiber 312 from the isolator 310b is affixed via epoxy to the edge of a spectrometer chip 302 after optical alignment to an on-chip waveguide 304. Light from the laser 310a (a probe beam) travels through a spiral probe region 320 of the waveguide 304 where Raman scattered light is generated from gases or liquids (not shown) in contact with the chip 302. This light then passes through an on-chip filter 330, which transmits the Raman signal and reflects the source light back to the probe region 320, where it can generate more Raman scattered light. The transmitted Raman signal light is then decomposed into the spectral components via a Fourier-transform spectrometer 340, which includes optical switches 342 (black boxes), phase modulators 344 (white boxes), and waveguides 346 of different path lengths in two arms 341 as described above. The output of the on-chip FTIR spectrometer 340 is measured using one or two large-area single element detectors 350 epoxy-bonded to the edge of the spectrometer chip 302. Not shown in FIG. 3 is the electrical wiring of the laser 310a, detector 350, and on-chip phase modulators 344. This chip 302 can be electrically connected to a separate board containing the analog and digital electronics for control and signal readout.

FIG. 4 shows a completely integrated on-chip FT-Raman spectrometer system 400. This particular embodiment contains all five optical components waveguide integrated on a single planar substrate 402. The dotted boxes denote a laser source 410 coupled to an on-chip optical waveguide 404, routed to a spiral-shaped probe region 420, where light travels a relatively large distance interacting with gas and liquid molecules, then routed to an on-chip optical filter 430 that removes the laser frequency light and allows the Raman-shifted light to pass to an on-chip FTIR spectrometer 440 with discretely tunable arm lengths, and finally to one or more detector elements 450 that enable readout of the signal for each wavelength. Again, the on-chip FTIR spectrometer 440 includes phase modulators 444 (white boxes) and waveguides 446 of different path lengths coupled to optical switches 442 (black boxes). FIG. 4 doesn't show the electrical wiring of the laser 410, detector(s) 450, or on-chip phase modulators 444. This chip 402 can be electrically connected to a separate board containing the analog and digital electronics for control and signal readout.

One advantage of this integrated spectrometer 400 shown in FIG. 4 is that the high degree of miniaturization means that the system can be free of optical fibers. In addition, the system can be especially resistant to physical shock or vibration. Significant decreases in optical coupling losses are possible by integrating many or all of the components on a single chip. In addition, the spiral waveguide probe structure 420 results in a ~$10^4$ enhancement in the device's ultimate sensitivity. This device 400 is ideal for monitoring the concentration of various organic chemicals or pollutants in the gas or liquid phase. Applications include air-quality monitoring, leak detection in oil and gas systems, early-warning-systems for contamination of freshwater bodies of water, and monitoring of different research or industry processes involving unknown chemicals or biological species.

Examples of the above-mentioned 3D waveguide-coupled sensing approach are also disclosed. In one example spectrometer 500, shown in FIGS. 5A and 5B, a laser 510 launches a probe beam into a probing waveguide 520 integrated in or on a substrate 502. The probing waveguide 520 guides the probe beam to a reflective waveguide facet 522a formed at the end of the probing waveguide 522b and a micro-lens 524 formed on the backside of the waveguide substrate 502. The probe beam is first redirected by the facet coupler 522a to propagate out-of-plane and illuminates an analyte 501 via the micro-lens 524, which generates a prescribed illumination pattern (e.g., collimated, focused, or structured etc.). For example, the waveguide micro-optical couplers 522a and 522b can act as confocal imagers and spatially filter out noise from background and ambient light and suppress inter-channel cross-talk.

The scattered or reflected light, including the Raman signal, is collected by the micro-lens 524 and a receiving waveguide coupler 522b, which converts the probe beam into a waveguide mode in a receiving waveguide 526. The micro-lens 524 may also be formed on top of the waveguides 520 and 526 by properly configuring the waveguide couplers 522a and 522b. On-chip filters and spectrometer 540 block any collected probe light and separate the collected Raman signal into different spectral bins for detection by one or more photodetectors 550. Electronics (not shown), which are powered by a battery 515, control the laser 510 and spectrometer 540 and process the signals from the photodetector 550.

Figure 6:
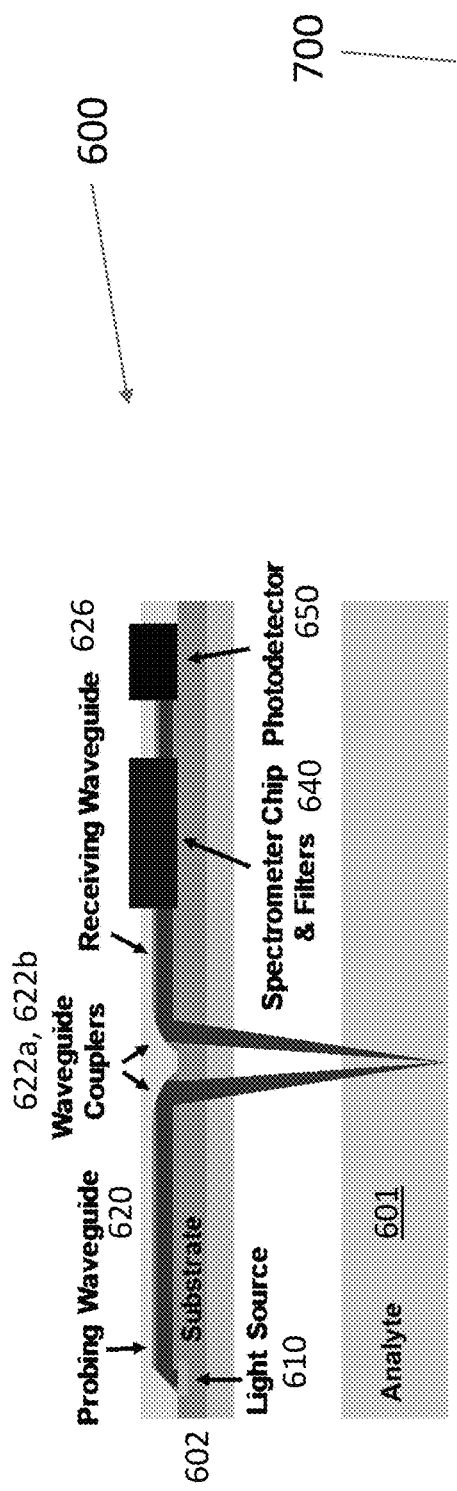
FIG. 6 shows a side view of a 3D waveguide-coupled probing/detecting approach where probe beams are coupled out of and into waveguides via a pair of curved reflective facets to form a prescribed illumination pattern on the analyte.

FIG. 6 shows an integrated spectrometer 600 with curved waveguide facets 622a and 622b for probing an analyte 601 and collecting a Raman signal from the analyte. The integrated spectrometer 600 has a laser 610 that launches a probe beam into a probing waveguide 620 that ends in a first curved waveguide facet 622a that reflects and focuses the probe beam onto the analyte 601. A second curved waveguide facet 622b collects the scattered or reflected light from the analyte 601 and couples it into a receiving waveguide 626.

The facets 622a and 622b can be curved or shaped to focus or collimate light and may have the same or different curvatures. For instance, the first facet 622a may be shaped to focus the probe beam on or just below the surface of the analyte 601. And the second facet 622b may be shaped to couple the scattered or reflected light into the receiving waveguide 626 based on the receiving waveguide's numerical aperture. The facets 622 and 622b can also be configured to re-direct the light to either side of the waveguide plane.

As explained above, the receiving waveguide 626 couples the collected light into on-chip filters and a spectrometer 640, which block any collected probe light and separate the collected Raman signal into different spectral bins for detection by one or more photodetectors 650. Electronics (not shown) control the laser 610 and spectrometer 640 and process the signals from the photodetector 650.

Figure 7:
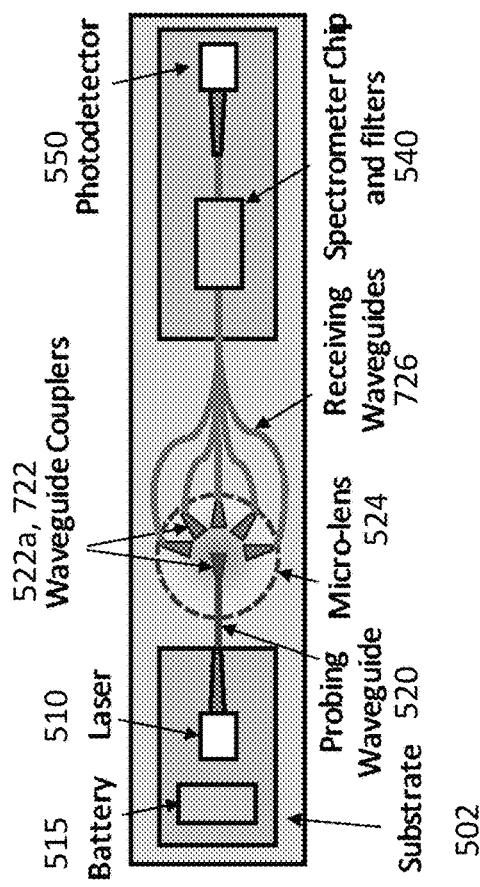
FIG. 7 shows a top view of a 3D waveguide-coupled FTIR Raman spectrometer with multiple receiving waveguides that couple the Raman signal from the lens to the spectrometer chip.

The input laser light may be distributed into multiple probing channels to probe different regions of the analyte, which allows differentiating Raman scattered light, directly reflected light, and background noise by post-processing the data collected in each channel. Multiple receiving waveguides and waveguide couplers may be used to enhance the collection efficiency of Raman scattered light. For example, FIG. 7 shows a modified version 700 of the spectrometer 500 in FIGS. 5A and 5B with many receiving facets 722 and receiving waveguides 726 for collecting light from different regions or angles. The receiving facets 722 are arranged in a ring-shaped array around the probe facet 522a and couple light to respective receiving waveguides 726, which are coupled to the spectrometer and filters 540. They further improve the collection of scattered Raman light while spatially filtering out secularly reflected probing light. Other arrangements are also possible, for example, including asymmetric arrays of waveguides. Similarly, other types of facets are also possible—the waveguides 722 in FIG. 7 receive light via a micro-lens, but could be curved instead (e.g., as in FIG. 6). They can also be used with multiple illuminating facets, or there could be multiple illuminating facets and only one collecting facet.

The 3D waveguide-coupled probing/detecting approach is particularly attractive to wearable or conformal sensors as it effectively brings confocal imaging onto the surface of a substance while utilizing planar waveguide structures and integrated photonic components. The out-of-plane coupled waveguide structure can be combined with the evanescently-coupled waveguide structures to form a 2D/3D hybrid sensing scheme.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
 a light source to emit a probe beam;
 a probe waveguide, in optical communication with the light source, to receive the probe beam and cause at least a portion of the probe beam to interact with a sample, the interaction between the probe beam and the sample generating a Raman signal;
 a filter, in optical communication with the sample, to transmit the Raman signal and block the probe beam;
 a Fourier transform spectrometer in optical communication with the filter, the Fourier transform spectrometer comprising:
  a beam splitter to split the Raman signal into a first portion and a second portion;
  a first interference arm, in optical communication with the beam splitter, to receive the first portion of the Raman Signal, the first interference arm comprising:
   a first optical switch switchable between a first state and a second state;
   a first reference waveguide having a first optical path length $L_1$ to receive the first portion of the Raman signal when the first optical switch is in the first state; and
   a first variable waveguide having a second optical path length $L_2$, different than the first optical path length $L_1$, to receive the first portion of the Raman signal when the first optical switch is in the second state; and a second interference arm, in optical communication with the beam splitter, to receive the second portion of the Raman Signal; and at least one detector, in optical communication with the first interference arm and the second interference arm, to detect interference of the first portion of the Raman signal from the first interference arm and the second portion of the Raman signal from the second interference arm.

2. The system of claim 1, wherein the probe waveguide comprises a spiral-shaped waveguide section.

3. The system of claim 1, further comprising:
a lens, in optical communication with the probe waveguide, to focus the probe beam toward the sample.

4. The system of claim 3, wherein the lens is configured to collect the Raman signal from the sample, and further comprising:
at least one other waveguide, in optical communication with the lens, the couple the Raman signal from the lens to the filter.

5. The system of claim 4, wherein the at least one other waveguide comprises:
an array of waveguides in optical communication with the sample, each waveguide in the array of waveguides being configured to receive a corresponding portion of the Raman signal from the sample.

6. The system of claim 1, wherein the probe waveguide comprises a first curved facet to focus the probe beam toward the sample.

7. The sample of claim 6, further comprising:
another waveguide, in optical communication with the sample and the filter, the other waveguide having a second curved facet to collect the Raman signal from the sample.

8. The system of claim 1, wherein the filter comprises a Bragg reflector.

9. The system of claim 1, further comprising:
a beam combiner in optical communication with the first interference arm and the second interference arm, the beam combiner comprising:
a first input, in optical communication with the first interference arm, to receive the first portion of the probe beam;
a second input, in optical communication with the second interference arm, to receive the second portion of the probe beam;
a first output; and
a second output,
wherein the at least one detector comprises:
a first detector in optical communication with the first output; and
a second detector in optical communication with the second output.

10. The system of claim 1, further comprising:
a substrate, wherein the at least one probe waveguide, the filter, the Fourier transform spectrometer, and the at least one detector are fabricated on or in the substrate.

11. A method of Raman spectroscopy, the method comprising:
emitting a probe beam from a laser;
guiding the probe beam from the laser to a sample via a first waveguide integrated in or on a substrate;
coupling the probe beam out of the first waveguide to a sample, the probe beam causing the sample to generate a Raman signal;
coupling the Raman signal into a second waveguide integrated in or on the substrate;
splitting the Raman signal into a first portion and a second portion;
guiding the first portion through a first interference arm integrated in or on the substrate, the first interference arm comprising:
an optical switch switchable between a first state and a second state;
a reference waveguide having a first optical path length L1 to receive the first portion when the first optical switch is in the first state; and
a variable waveguide having a second optical path length L2, different than the first optical path length L1, to receive the first portion when the first optical switch is in the second state; and
guiding the second portion through a second interference arm integrated in or on the substrate; and
interfering the first portion and the second portion at a detector coupled to the first interference arm and the second interference arm.

12. The method of claim 11, further comprising:
switching the optical switch between the first state and the second state.

13. The method of claim 11, wherein coupling the probe beam out of the first waveguide to the sample comprises focusing the probe beam toward the sample with a lens integrated in or on the substrate.

14. The method of claim 13, wherein coupling the Raman signal into the second waveguide comprises collecting the Raman signal from the sample with the lens.

15. The method of claim 11, wherein coupling the Raman signal into the second waveguide further comprises coupling respective portions of the Raman signal into respective waveguides in an array of waveguides integrated in or on the substrate.

16. The method of claim 11, wherein coupling the probe beam out of the first waveguide to the sample comprises focusing the probe beam with a curved facet at an end of the first waveguide.

17. The method of claim 11, wherein coupling the Raman signal into the second waveguide comprises reflecting the Raman signal off a second curved facet into the second waveguide.

18. A Raman spectroscopy system comprising:
a substrate;
a laser, integrated on the substrate, to emit a probe beam;
a first waveguide, integrated on or in the substrate in optical communication with the laser, to guide the probe beam;
a lens, integrated on or in the substrate in optical communication with the first waveguide, to direct the probe beam to a sample and to collect a Raman signal from the sample in response to the probe beam;
at least one second waveguide, integrated on or in the substrate in optical communication with the lens, to guide the Raman signal;
a spectrometer, integrated on or in the substrate in optical communication with the at least one second waveguide, to separate the Raman signal into spectral bins; and
at least one photodetector, integrated on or in the substrate in optical communication with the spectrometer, to detect an output of the spectrometer, wherein the spectrometer comprises:
- an optical switch switchable between a first state and a second state;
- a reference waveguide having a first optical path length L1 to receive a first portion of the Raman signal when the first optical switch is in the first state; and
- a variable waveguide having a second optical path length L2, different than the first optical path length L1, to receive the first portion when the first optical switch is in the second state.

19. The Raman spectroscopy system of claim 18, wherein the at least one second waveguide comprises an array of second waveguides, each of which is configured to guide a corresponding portion of the Raman signal.

\* \* \* \* \*